N., L. & H. NILSON.
TRACTION ENGINE.
APPLICATION FILED MAY 14, 1909.
1,051,624.
Patented Jan. 28, 1913.
3 SHEETS—SHEET 1.
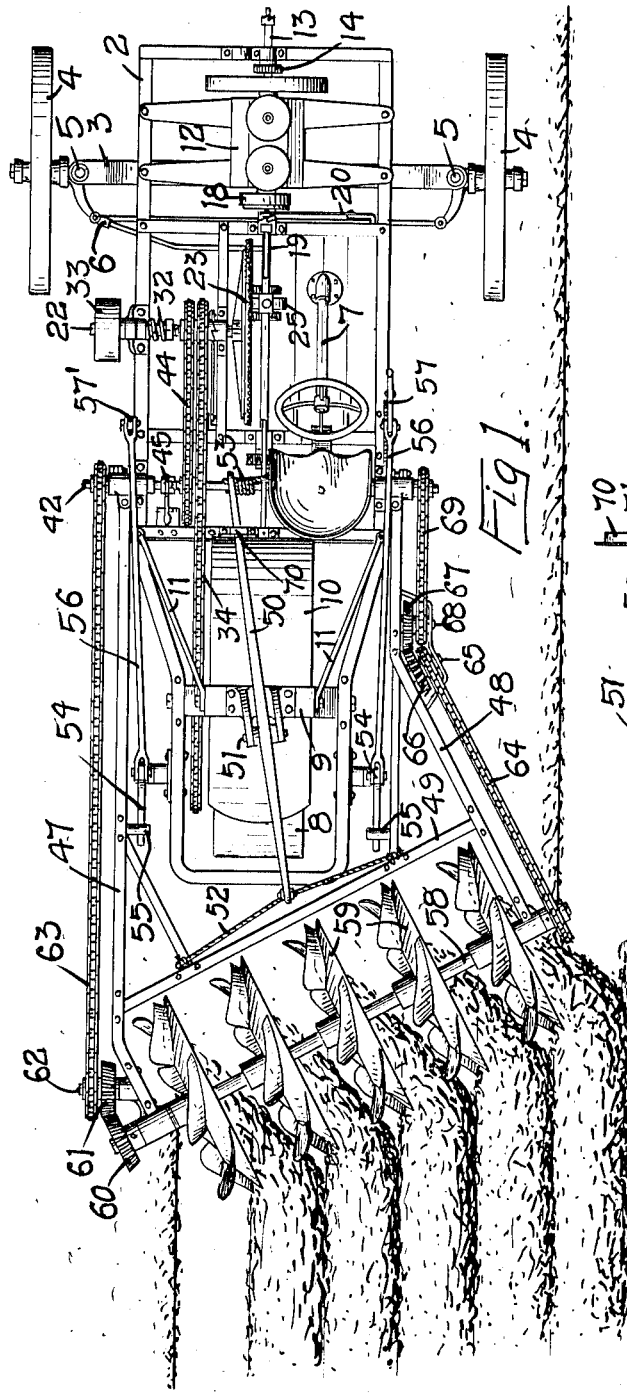
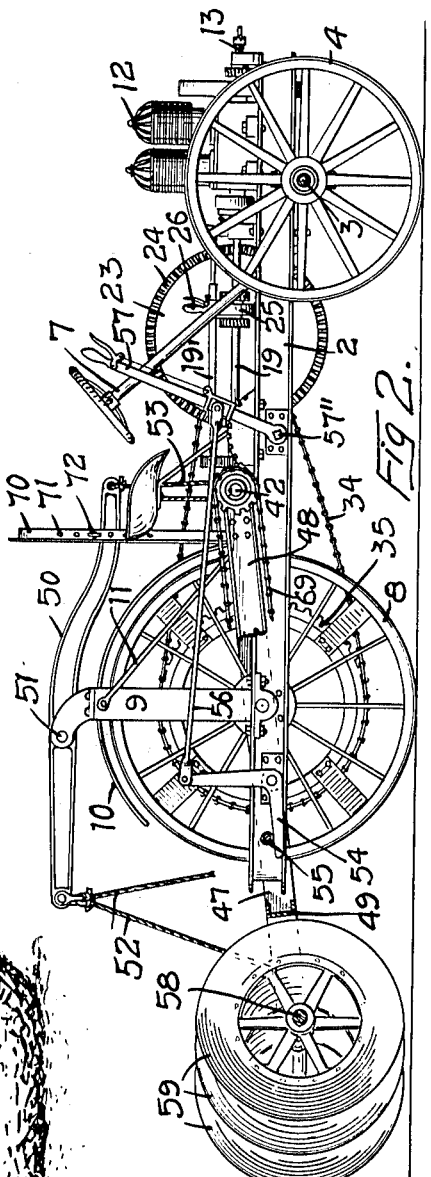
WITNESSES
INVENTORS
NILS NILSON
LEONARD NILSON
HAROLD NILSON
ATTORNEYS N., L. & H. NILSON.
TRACTION ENGINE.
APPLICATION FILED MAY 14, 1909.
1,051,624.
Patented Jan. 28, 1913.
3 SHEETS—SHEET 2.
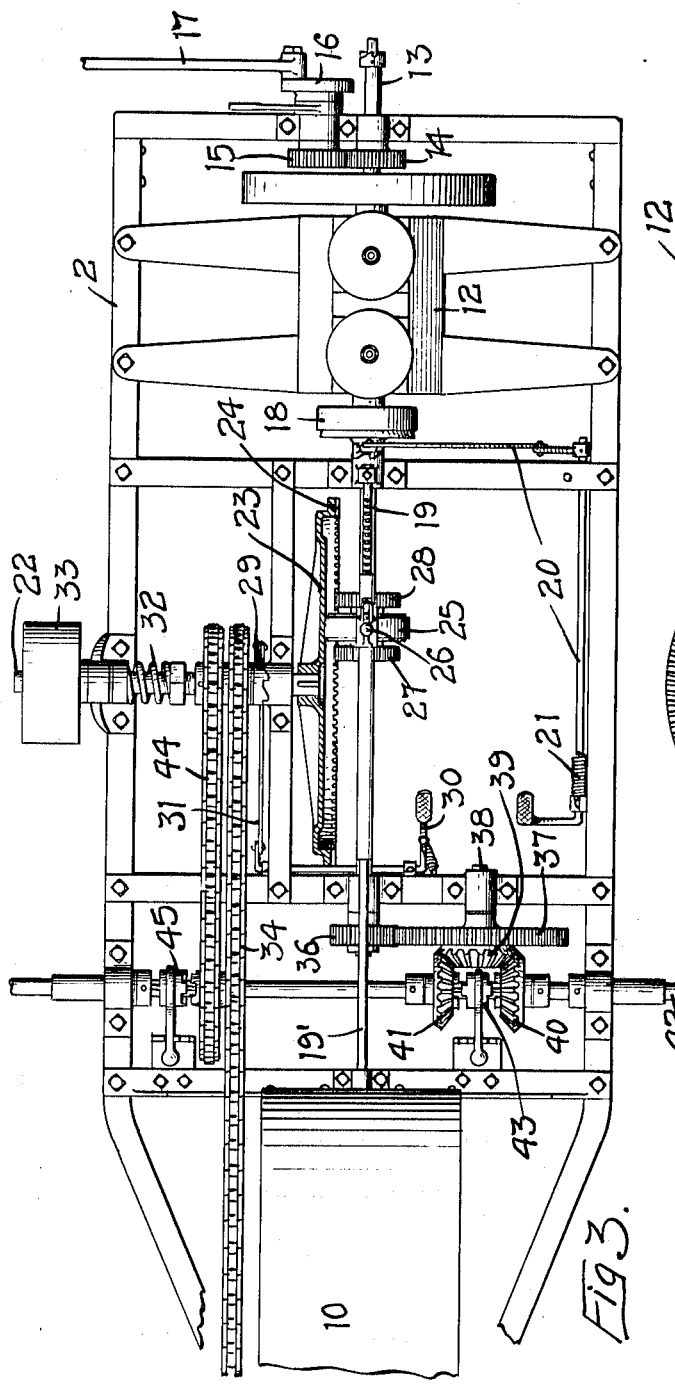
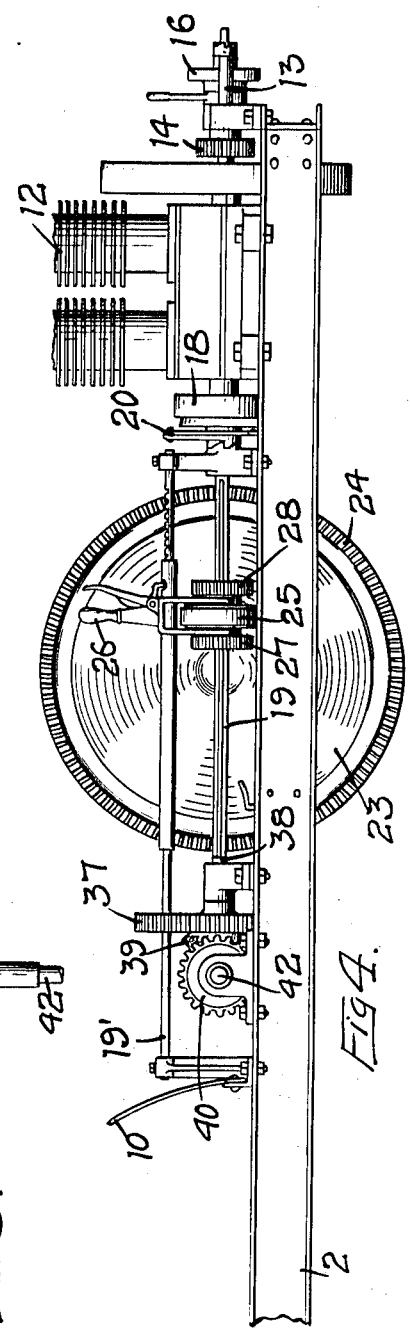
WITNESSES
INVENTORS
NILS NILSON
LEONARD NILSON
HAROLD NILSON
BY Paul & Paul
ATTORNEYS

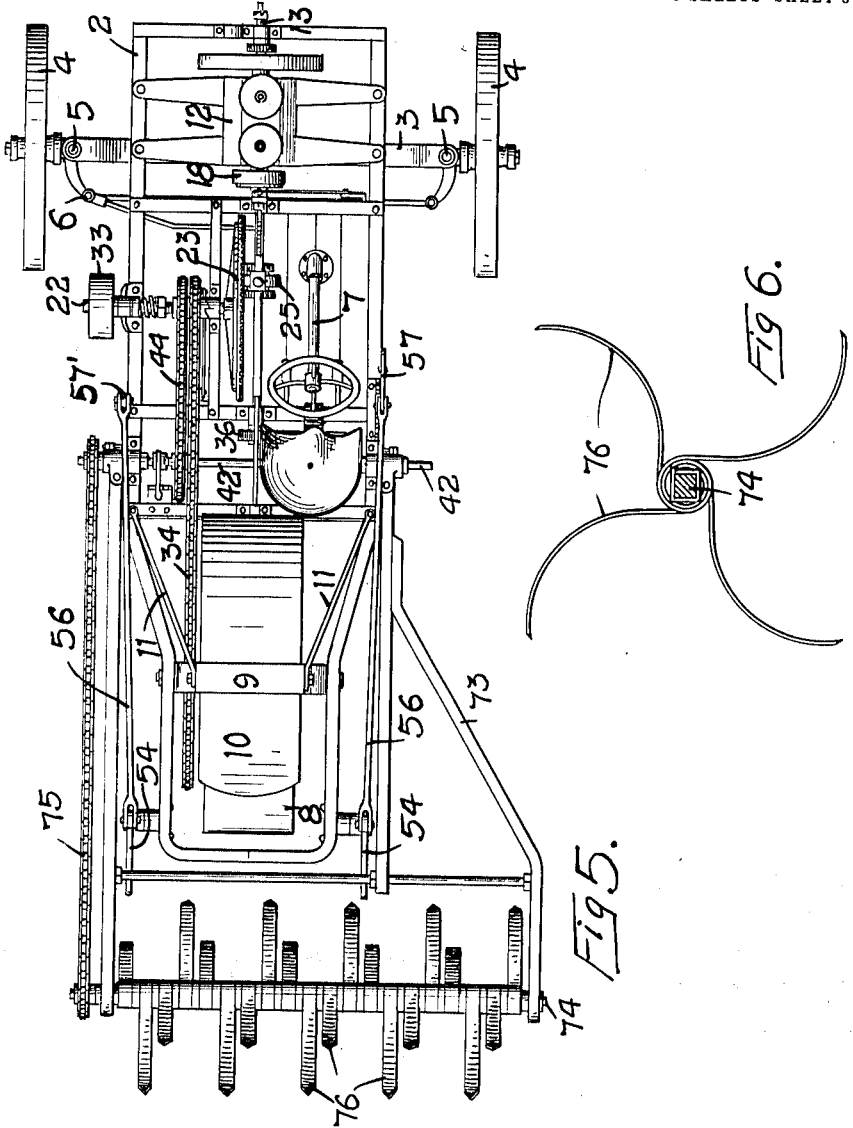

UNITED STATES PATENT OFFICE.

NILS NILSON, LEONARD NILSON, AND HAROLD NILSON, OF WAYZATA, MINNESOTA.

TRACTION-ENGINE.

1,051,624.  Specification of Letters Patent.  Patented Jan. 28, 1913.

Application filed May 14, 1909. Serial No. 495,858.

*To all whom it may concern:*

Be it known that we, NILS NILSON, LEONARD NILSON, and HAROLD NILSON, of Wayzata, Hennepin county, Minnesota, have invented certain new and useful Improvements in Traction-Engines, of which the following is a specification.

The object of our invention is to provide a traction engine adapted for use with a variety of agricultural implements and capable of use with mechanism attached in front as well as in the rear of the engine.

A further object is to provide an engine of simple, durable construction and one which will be comparatively light and inexpensive to manufacture and hence within the reach of the owners of small farms, the machine being designed to take the place of animal power almost entirely in the tilling of the soil.

Our invention consists generally in engines having means for driving agricultural implements at a certain speed and moving the engine across the field at a varying speed, if desired.

Further, the invention consists in various constructions and combinations, all as hereinafter described and particularly pointed out in the claims.

In the accompanying drawings, forming part of this specification, Figure 1 is a plan view of a traction engine, illustrating the application of the machine to the operation of a gang plow, Fig. 2 is a side elevation of the same, Fig. 3 is a view of the engine, partially in section, illustrating the driving mechanism in detail, Fig. 4 is a side view of the engine, showing the arrangement of the friction drive mechanism, Fig. 5 is a plan view of the engine, illustrating the manner of attaching a cultivator thereto, Fig. 6 is a detail, sectional view, showing the manner of mounting the cultivator teeth.

In the drawing, 2 represents the frame of the engine, composed preferably of I-beam construction on account of its strength and rigidity, and having a forward axle 3 and wheels 4 pivoted at 5 in the usual manner where oscillation of the wheels for guiding purposes is desired, and connected by a mechanism 6 with a steering post 7, such as is usually employed with automobiles.

8 is a rear traction wheel centrally supported between the side rails of the machine and 9 is a yoke secured at its lower ends to said frame and extending up over the traction wheel and supporting a guard 10. The yoke is braced by means of rods 11.

At the forward end of the machine, we provide an engine 12 of the gas type having a shaft 13, to the forward end of which the pitman rod of a mower may be attached, as shown and described in a pending application for U. S. Letters Patent of even date herewith Serial No. 495,857. In making the attachment for the mower, we prefer to provide a gear 14 on the shaft 13, meshing with a gear 15, journaled on the frame of the engine and having a crank disk 16 connected therewith, on which the pitman rod 17 is mounted. A clutch 18 is provided between the shaft 13 and a shaft 19 that is arranged lengthwise in the machine near the middle portion thereof, and one member of the clutch 18 is thrown to its operative position or inoperative position by means of a foot-operated mechanism 20, which is arranged, when actuated by the foot of the driver, to throw the clutch to its operative position and transmit the power of the engine to the shaft 19. Upon the release of the mechanism, a spring 21 will separate the clutch members.

22 is a shaft arranged at right angles substantially to the shaft 19 and carrying a friction disk 23 and a gear ring 24 inclosing said disk. A friction drive wheel 25 is splined on the shaft 19, being movable back and forth thereon and on a guide rod 19′ by means of a handle 26, and gears 27 and 28 are provided on opposite sides of the drive wheel 25 and adapted to move back and forth on the shaft 19 therewith. These gear wheels mesh with the gear ring 24 and form a positive drive between the shaft 19 and the said ring, the engagement of one gear with the ring causing the ring to be driven in one direction and the engagement of the other gear with the ring driving it in the opposite direction, as will be readily understood. The gear ring projects beyond the face of the disk 23, so that the gears 27 and 28 will not contact with the said disk, and the gear ring is located a sufficient distance outside the periphery of the disk, so that when either gear is in engagement with the ring, the friction drive will be inoperative. When however, the friction drive is moved toward the center of the disk and the gears are rendered inoperative, the surface of the drive wheel will contact with the disk and transmit the power from the shaft 19 to the disk. A mechanism 29, operated by a treadle 30, and a connection 31 permits the disk 23 to be moved out of engagement with the friction drive wheel against the tension of a spring 32, which normally holds the disk in engagement with the drive wheel. A pulley 33 is provided on the outer end of the shaft 22, from which through a suitable belt, (not shown) power may be transmitted for operating a threshing machine, cream separator or other mechanism. The movement of the friction drive wheel 25 back and forth on the shaft 19, will allow the speed of the friction disk to be varied, according to the location of the drive wheel, as usual in friction drives of this type.

A belt 34 connects the shaft 22 with a sprocket 35 on the traction wheel 8 and by this means the engine is moved back and forth across the field and its movement may be made positive either forward or backward by means of the gears 27 and 28 and the gear ring 24, or whenever desired, these gears may be thrown out of mesh and the friction drive employed to operate the engine at any desired speed, according to the character of the work to be performed.

The shaft 19 has a pinion 36 secured thereon, meshing with a gear 37 on a shaft 38. A bevel gear 39 is secured on the shaft 38 between gears 40 and 41, mounted on a shaft 42 and arranged to be alternately locked thereon by a clutch device 43. The shaft 42 projects beyond the frame of the machine on each side and may be utilized for driving an agricultural implement, or for other purposes. The shaft 42 has a belt 44 connecting it with the shaft 22, and a clutch 45 is provided on the shaft 42, by means of which the belt 44 is rendered operative. With this mechanism, an agricultural implement attached to either end of the shaft 42 and the traction wheel may be driven positively and simultaneously from the driving shaft through the gears 36 and 37 and 40 and 41 and the belts 44 and 34, or by means of the clutch mechanism either the agricultural implement or the traction wheel may be operated independently of one another. It may be desirable at times to provide a slower positive drive and this we accomplish through the gears 27 and 28 and the ring 24, the power from the driving shaft being transmitted through the belts 44 and 34 to the shaft 42 and the traction wheel or to either one of them to provide a slower positive drive. If it is desired to operate both the traction wheel and the agricultural implement at a varying speed, we are able to accomplish this through the drive wheel 25 and the friction disk 23, the power therefrom being transmitted through the belts 44 and 34 to the shaft 42 and the traction wheel. We may also with this mechanism, by leaving the clutch 45 in its inoperative position, transmit power to the traction wheel through the belt 34 and move the machine forward at a varying speed and at the same time, drive the shaft 42 positively from the driving shaft through the gears 36 and 37. This arrangement we regard as an important feature of our invention, as it allows us to operate the agricultural implement at a positive high speed while the engine is moved forward or backward at a variable speed.

In Figs. 1 and 2 we have illustrated the application of the invention to the operation of a gang plow, in which case, a frame is provided consisting of rails 47 and 48, mounted at their forward ends on the shaft 42 and projecting rearwardly therefrom. The rail 48, having a laterally-turned rear portion, is connected with the opposite rail by a cross bar 49. This frame is capable of swinging vertically by means of a rocker bar 50 pivoted at 51 on the yoke 9 and having a flexible connection 52 at its rear end with the gang plow frame. The forward end of the rocker bar 50 has one end of a cable 53 attached thereto, the opposite end being wound on the shaft 42 and by this means the gang plow frame is lifted from its normal working position and the plows raised out of contact with the soil. The plow frame may also be lifted by means of bell cranks 54 pivoted on the machine frame and adapted to engage pins 55 and connected by rods 56 with a lever 57 and an arm 57' on a rock shaft 57''. A shaft 58 is mounted in the bars 47 and 48 and carries a series of plows 59. A gear 60 is secured on one end of a shaft 58 and meshes with a similar gear 61 on a stud 62, which has a driving connection 63 with the shaft 42. The opposite end of the shaft 58 has a driving connection 64 with a stud 65, which has a gear 66, meshing with a gear 67 on a stud 68. A belt 69 connects the stud 68 with the shaft 42. By means of these connections, the gang of plows can be revolved in either direction, according to the nature of the work to be performed. The rocker 50 is capable of adjustment by means of a bar 70 having holes 71 therein and a pin 72 fitting said holes. In Fig. 5, a frame 73 is mounted in a similar manner on the shaft 42, carrying a shaft 74 driven by a belt 75 from the shaft 42 and having a series of spring cultivator fingers 76 mounted on the shaft 74 and arranged to dig into the soil as said shaft is revolved.

We claim as our invention:—

1. In a traction engine, the combination, with a frame having a traction wheel, of a source of power mounted on said frame, a driving shaft connected with said source of power, a counter shaft having a positive driving connection with said driving shaft, and a clutch for rendering said driving connection operative or inoperative, said counter shaft having means for connection with an agricultural implement, a second shaft having a friction drive connection with said driving shaft, and a clutch device for rendering said friction drive connection operative or inoperative, a driving connection between said second shaft and said traction wheel, a driving connection between said second shaft and said counter shaft, and a clutch device for rendering said last named driving connection operative or inoperative, whereby said counter shaft and implement can be operated continuously at a uniform speed through said positive driving connection or intermittently at a varying speed through said friction drive connection.

2. In a traction engine, the combination, with a frame and carrying wheels therefor, and a source of motive power mounted on said frame, of a driving shaft connected with said source of power, a counter shaft, a friction disk, a shaft therefor, a friction wheel forming a driving connection between said friction disk and said driving shaft, a clutch device controlling the operation of said friction disk and positive driving connections between said disk shaft and said counter shaft and one of said carrying wheels, whereby said counter shaft and said carrying wheel may be positively operated and at a variable speed, said counter shaft having a clutch device for rendering its driving connection with said disk shaft inactive, substantially as described.

3. In a traction engine, the combination, with a frame having a rear traction wheel, of a source of power mounted on the forward portion of said frame, a driving shaft extending rearwardly from said source of power along the middle portion of said frame, a counter shaft journaled transversely of said frame in front of said traction wheel and near the rear end of said driving shaft and having gear connections with said driving shaft and a clutch for rendering said gear connections active or inactive, and whereby said counter shaft may be driven at a uniform speed from said driving shaft, a second transverse shaft disposed at one side of said driving shaft and having a friction drive connection therewith and a clutch for rendering said second shaft active or inactive, a drive belt connecting said second shaft with said rear traction wheel, a second drive belt connecting said second shaft with said counter shaft, and a clutch for rendering said second drive belt active or inactive, whereby said counter shaft and said traction wheel may be driven at a variable speed from said driven shaft.

In witness whereof, we have hereunto set our hands this 3rd day of May 1909.

NILS NILSON.
LEONARD NILSON.
HAROLD NILSON.

Witnesses:
J. A. BYINGTON,
JESSIE M. SULLIVAN.